United States Patent [19]

Kastening et al.

[11] 4,067,787
[45] Jan. 10, 1978

[54] METHOD OF MAKING HYDROGEN PEROXIDE

[75] Inventors: Bertel Kastening, Hamburg; Heinrich Schmitz, Julich, both of Germany

[73] Assignee: Kernforschungsanlage Julich Gesellschaft mit beschrankter Haftung, Julich, Germany

[21] Appl. No.: 631,379

[22] Filed: Nov. 12, 1975

[30] Foreign Application Priority Data

Nov. 13, 1974  Germany .......................... 2453739

[51] Int. Cl.$^2$ .............................................. C25B 1/30
[52] U.S. Cl. ............................................... 204/84
[58] Field of Search ........................................ 204/84

[56] References Cited

U.S. PATENT DOCUMENTS

| | | | |
|---|---|---|---|
| 2,091,129 | 8/1937 | Berl | 204/84 |
| 2,093,989 | 9/1937 | Berl | 204/84 |
| 3,454,477 | 7/1969 | Grangaard | 204/84 |
| 3,884,777 | 5/1975 | Harke et al. | 204/84 |
| 3,968,273 | 7/1976 | Kastening et al. | 204/84 |

*Primary Examiner*—T. Tung
*Attorney, Agent, or Firm*—Walter Becker

[57] ABSTRACT

A method of and electrolytic cell for making hydrogen peroxide, according to which oxygen is introduced into an electrolyte solution which contains in dissolved form an organic compound forming a redox system. After reduction of the oxidized form of the organic compound on the cathode of the electrolytic cell, which preferably has a cathode of glass-like carbon or graphite, and which is passed through by the current and after formation of the reduced form of the organic compound, the oxygen introduced into the electrolyte solution is reduced by reaction with the thus obtained reduced form of the organic compound. With a simultaneous re-formation of the oxidized form of the organic compound, peroxide is formed whereupon there is introduced into the electrolyte solution for separating the formed peroxide such a quantity of an alkaline earth metal compound that the peroxide is precipitated as alkaline earth metal peroxide and the precipitated alkaline earth metal peroxide is filtered off and withdrawn from the electrolyte solution, whereupon it is suspended in water, and acid is introduced into the thus formed suspension so that by reaction of the alkaline-peroxide with the acid hydrogen peroxide is formed.

5 Claims, 4 Drawing Figures

METHOD OF MAKING HYDROGEN PEROXIDE

The present invention relates to a method of making hydrogen peroxide, according to which by reduction of oxygen, peroxide is formed.

Hydrogen peroxide is used in various industries, for instance, as oxidizing agent or also for deriving therefrom peroxide. Hydrogen peroxide is also used for instance in the paper industry and in the textile industry as bleaching agent.

The preparation of hydrogen peroxide is known. According to one method of preparing hydrogen peroxide, sulfuric acid or an aluminum sulfate solution is oxidized anodically in an electrolytic cell to form peroxidic sulfuric acid, or is oxidized to form peroxidisulfate. In connection therewith, the peroxidic sulfuric acid or the peroxidisulfate is split hydrolytically at increased temperatures. The hydrogen peroxide formed in this connection is separated from the remaining reaction components by vacuum distillation. This method has the drawback that for practicing said method a relatively high amount of energy is required. Furthermore, due to the aggressiveness of the medium, and due to the very positive anode potential necessary in this connection, the anodes must consist of a highly resistant material so that as anode material, for all practical purposes, only platinum can be used. Finally, the said method has the further drawback that due to corrosion occurring in view of the hydrolytic separation or division occurring with this method, and in view of the necessity to subsequently carry out a distillative separation of the hot sulfuric acid, the material of the device employed for carrying out the method has to meet unduly high requirements.

There has also become known a method of making hydrogen peroxide, according to which hydrogen peroxide is obtained in addition to quinone obtained by the oxidation from the air of hydroquinones, for instance, of alkylanthrahydroquinones. While this method does not have the drawbacks of the above outlined electrolytic method, it is disadvantageous that neither the oxidation process nor the recovery of the hydroquinone required with the method is selective enough by catalytic hydration of quinone. The catalysts are with this method suspended in the reaction solution. As catalyst only rather expensive metals may be used such as platinum, raney nickel or the like. This makes the method rather expensive. In addition thereto, prior to initiating the oxidation of the hydroquinone, the catalysts suspended in the solution have to be separated from the working solution. This makes the said method rather awkward, and inasmuch as by-products are formed with this method, additional awkward cleaning or purifying steps are necessary in order to withdraw the hydrogen peroxide from the reaction solution in the circuit.

There has also become known a suggestion for making hydrogen peroxide, according to which a cathodic reduction of oxygen is effected while employing an aqueous solution of potassium chloride as electrolyte. In this connection, according to the above mentioned suggestion, the electrolyte containing the hydroperoxide ions is withdrawn from the electrolysis, is neutralized by hydrochloric acid, and the thus formed hydrogen peroxide is obtained by distillation (see E. Berl, Trans. Electrochem. Soc. 76 (1939), page 359). However, experience has shown that this method is unsuitable for use in practice because, due to the low solubility of oxygen in electrolyte solutions at normal pressure, economic current densities can be realized only when using rather expensive technical devices.

It is, therefore, an object of the present invention to provide a method of preparing hydrogen peroxide, which can be carried out in a simple manner and in which nevertheless a high output will be assured.

It is a further object of this invention to provide a method as set forth in the preceding paragraph, in which the formation or deposit of harmful by-products will be avoided.

These and other objects and advantages of the invention will appear more clearly from the following specification in connection with the accompanying drawings, in which:

FIG. 1 graphically illustrates the functional dependency of the current density from the electrode potential measured with regard to a normal hydrogen electrode as reference electrode and its comparison with and without employment of an organic compound forming a redox system.

Figure 1:
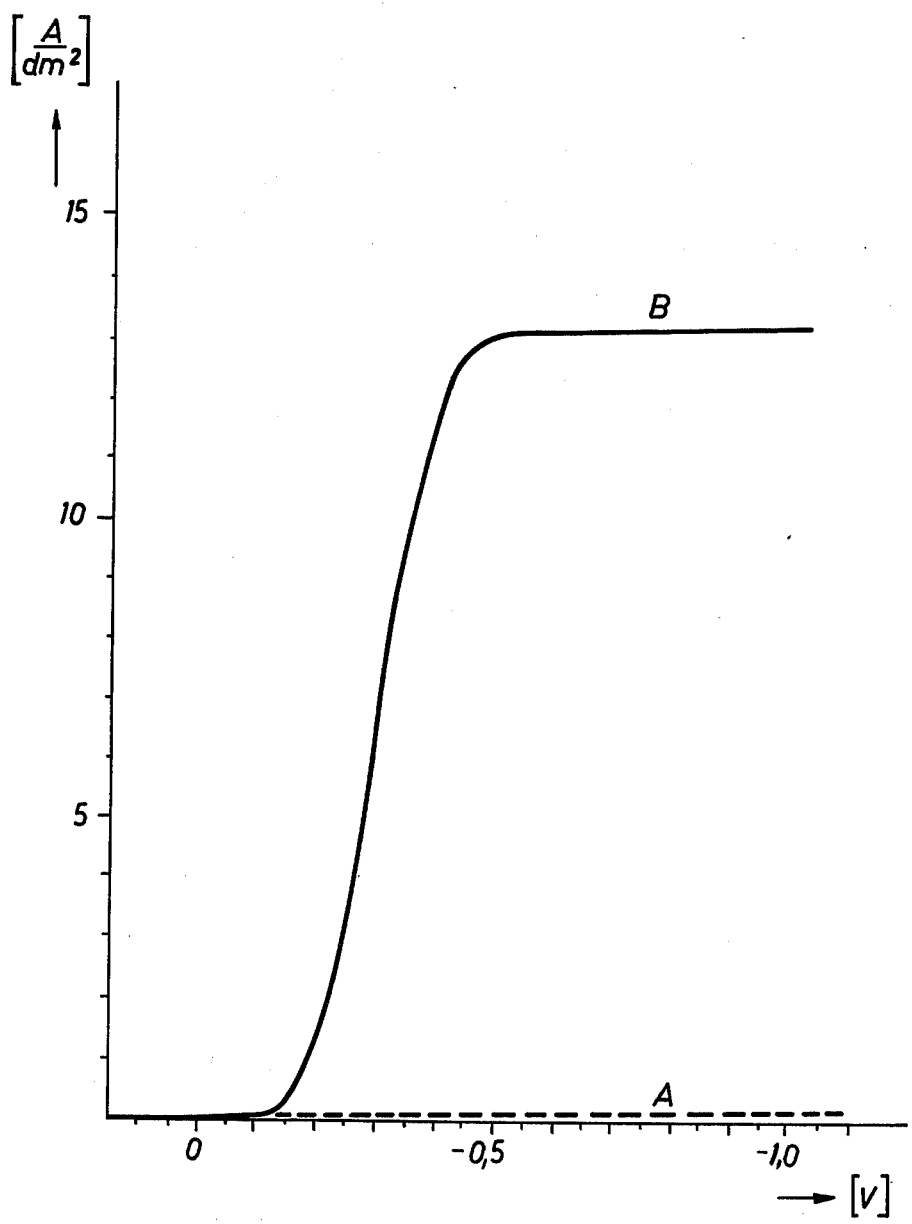

The method according to the present invention is characterized primarily in that the oxygen is conveyed into an electrolyte solution which contains in dissolved form an organic compound that forms a redox system while after reduction of the oxidized form of the organic compound on the cathode of the electrolysis cell passed through by a current and after the reduced form of the organic compound has formed the oxygen conveyed to the electrolyte solution by reaction with the thus formed reduced form of the organic compound is reduced while forming peroxide while at the same time the oxidized form of the organic compound is reformed, whereupon for purposes of separating the formed peroxide, such quantity of a substance consisting of an alkaline earth metal compound selected from the group of alkaline earth metal hydroxide, alkaline earth metal oxide, and an alkaline earth salt is added to the electrolyte solution that the peroxide precipitates as alkaline earth metal peroxide, whereupon the precipitated alkaline earth metal peroxide is after being filtered withdrawn from the electrolyte solution, is suspended in water and acid is introduced into the thus formed suspension so that by reaction of the alkaline earth metal peroxide with said acid, hydrogen peroxide is formed which subsequently thereto is separated from the solution.

According to the method of the present invention, hydrogen peroxide is obtained without impurities by by-products and in dissolved condition in water. By means of distillation, it is possible without difficulties to produce the concentration desired in connection with the specific requirements.

It is particularly advantageous to re-precipitate into an alkaline earth metal carbonate the precipitated alkaline earth metal peroxide by introducing carbon dioxide into the suspension of the filtered-off alkaline earth metal peroxide while simultaneously forming hydrogen peroxide. Thereupon, the alkaline earth metal carbonate is filtered off and withdrawn. It is also expedient to introduce into the suspension or flotation the carbon dioxide at a pressure above the atmospheric pressure. In case that the alkaline earth metal salts are available as waste salt, it is expedient, for precipitating the peroxide, to employ an alkaline earth salt which is added in a solution corresponding to one of the utilized electrolyte solutions. If an electrolyte solution is to be utilized which is free from anions of the alkaline earth salt, it is expedient that the anions, which are freed during the precipitation of the alkaline earth metal peroxide by adding an alkaline earth metal salt, are removed by ion exchange from the aqueous electrolyte solution, whereupon the solution is again conveyed to the electrolysis cell.

It is furthermore expedient to employ as organic compound an alkali metal salt of the 2,7-anthraquinonedisulfono acid, said alkali metal salt being dissolved in an aqueous solution from the electrolyte solution. The alkali metal salt of the 2,7-anthraquinonedisulfono acid has a high solubility in an aqueous solution whereby very high current densities are obtainable.

With the method according to the invention, however, each solvent for the organic compound may be employed for instance also in an organic solvent, which, as the case may be, when adding thereto an electrolytic conducting salt is able to form an electrolyte solution and in which the organic compound is soluble in a quantity sufficient for the desired current density, and in which in the formed solution, the redox potential of the organic redox system is more negative than that of the system oxygen/hydrogen peroxide. This is the case for instance with an alcoholic solution of an azobenzol-(hydrazobenzol).

Due to the fact that with the method according to the invention, the components of the redox pair bring about the transmission of charges between the electrode and the oxygen in the solution, it will be realized in an advantageous manner that also at normal pressure and while employing smooth electrodes, high current densities and thus at the same time high transformation speeds can be obtained. The limit current densities obtained with the method according to the invention, are by a multiple higher than the limit current densities which are obtainable without the employment of an organic redox pair at direct cathodic reduction of oxygen.

It is also advantageous that due to the fact that the oxidized form of the organic compound is reduced on the cathode, an expensive reduction by means of catalysts becomes superfluous. The cathodic reduction, when selecting a not too negative electrode potential and not too great current densities will practically be completely limited to the transformation of the oxidized form into the reduced form of the organic redox pair. In this connection, no hydrogenation beyond this point is effected as it is employed for instance with the known alkylanthraquinone method and causes undesired by-products. Experience has shown that with the method according to the invention, the reduced form of the organic redox pair which forms on the cathode, transforms very quickly with the oxygen introduced into the electrolyte solution. This transformation of the reduced form of the organic redox pair with oxygen, which may also be introduced in the form of air oxygen, is effected very quickly so that a destruction of the organic substance while forming undesired by-products is, for all practical purposes excluded. If, in view of the redox potential of the organic redox system in the selected electrolyte solution, peroxide were reduced on the cathode to water, it may be expedient to add the oxygen to the electrolyte solution outside the electrolysis cell. It has proved particularly advantageous for carrying out the method according to the invention to employ an electrolysis cell in which there is inserted an electrode consisting of glass-like carbon or graphite as cathode. As a result thereof, a particularly high constant current density will be obtained. Furthermore, no reduction of the peroxide on the cathode will take place.

If an aqueous alkaline electrolyte solution is used which has no easily oxidizable anions, as is the case for instance with chloride ions, oxygen is generated at the anode in a quantity which theoretically corresponds to half that quantity which is required at the cathode for the conversion to peroxide. This oxygen, which is generated at the anode is therefore expediently, together with the quantity of oxygen in excess of the needed quantity of oxygen, again conveyed to the electrolyte. For carrying out this method, a modification of the electrolysis cell is particularly advantageous. This modification consists in that the space between the electrodes is by means of a diaphragm or an ion exchange diaphragm divided into an anode and a cathode chamber. When employing a cation exchange diaphragm and for instance employing an aqueous solution in the anode chamber, for instance, aqueous sulfuric acid or aqueous nitric acid, the oxygen generated at the anode is again conveyed to the cathode chamber.

The employment of an electrolysis cell with a chamber between the electrodes which is divided by a diaphragm or an ion exchange diaphragm has the additional advantage that the peroxide which is formed in the electrolyte and which would be destroyed at the anode is kept away therefrom. Therefore, when employing an electrolysis cell with an anode and a cathode chamber it is not necessary that the peroxide be kept away from the anode by maintaining a flow away from the anode during the electrolysis in the electrolyte.

The increase in the current density as it is obtainable by the method of the invention over the direct cathodic reduction of oxygen becomes evident from a diagram which is shown in the drawing. The drawing furthermore shows two alternative courses of the method according to the invention in the form of a flow sheet and also shows an electrolysis cell for practicing the method according to the invention.

More specifically, in the diagram illustrated in FIG. 1, two current density potential curves are shown for the reduction of oxygen on a smooth electrode of glass-like carbon. The curve A shown in dash lines is obtained with an electrolyte which is formed from aqueous 0.5 molar caustic soda, while stationary conditions are established by blowing oxygen into the electrolyte and agitating the same. The limit current density in the potential range which corresponds to the formation of hydrogen peroxide and which amounts to from about $-0.2$ to $-0.50$ volts will then amount to approximately $0.11 \text{ A/dm}^2$.

The curve B is obtained after the addition of sodium salt of the 2.7 anthraquinonedisulfono acid in a concentration of 0.55 mol/l to the electrolyte.

The limit current density corresponding to the formation of hydrogen peroxide which forms above about $-0.5$ volts will then amount to about $13.1 \text{ A/dm}^2$. This corresponds to an increase in the transformation for forming hydrogen peroxide by more than a factor 110.

Figure 2:
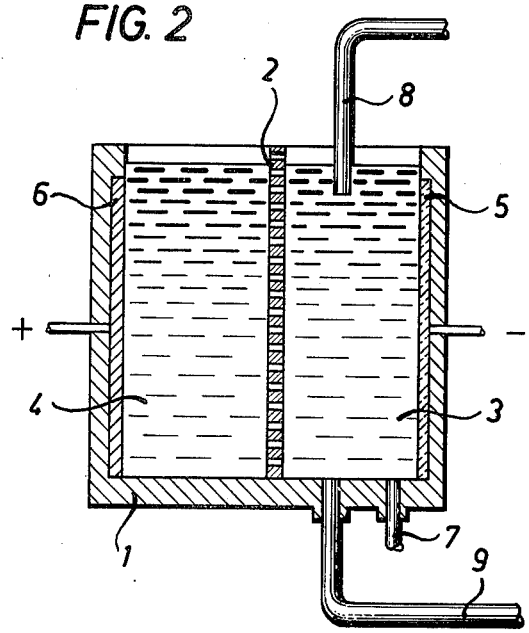
FIG. 2 shows an electrolysis cell with diaphragm for practicing the method according to the invention.

The electrolysis cell 1 illustrated in FIG. 2 has a diaphragm 2 by means of which the cell is sub-divided into a cathode chamber 3 and an anode chamber 4. The electrode serving as cathode 5 consists of a glass-type carbon, whereas the electrode employed as anode 6 consists of platinum. At the bottom of the cathode chamber there is provided a feeding line 7 for oxygen. Furthermore, there is provided a discharge 8 for withdrawing the electrolyte solution containing the peroxide. There is also provided a feeding line 9 for feeding the recovered peroxide-free electrolyte solution into the electrolysis cell.

Figure 3:
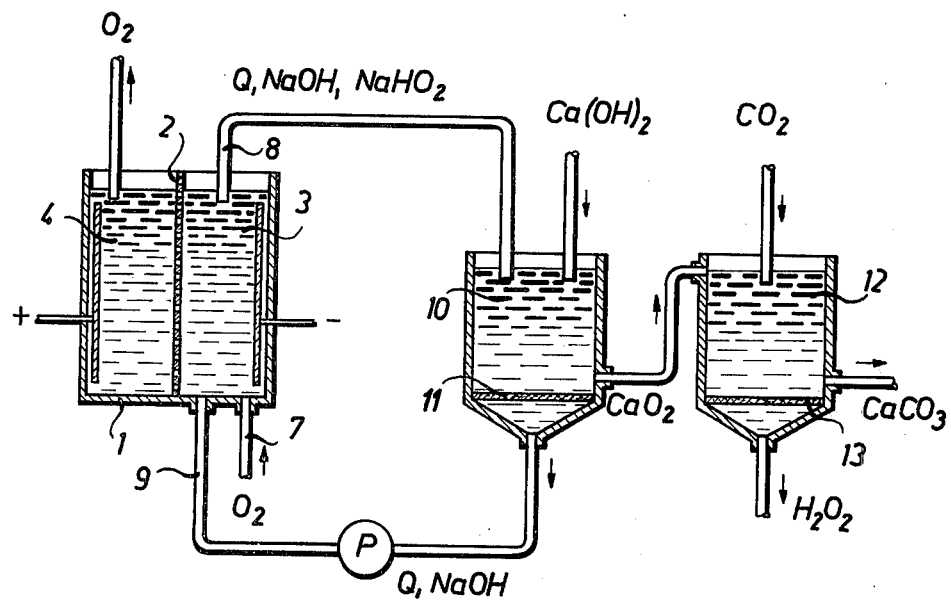
FIG. 3 is a flow sheet showing the course of the method according to the invention, in which for precipitating the peroxide, an alkali earth metal hydroxide is utilized.

As will be evident from FIG. 3, the cathode chamber 3 of an electrolysis cell designed according to the embodiment of FIG. 2 contains an alkaline metal electrolyte solution in which, during the current flow of the electrolysis cell there are contained an organic compound Q forming the redox system, sodium hydroxide and sodium hydroperoxide in dissolved form. As electrolysis cell, in the anode chamber (not illustrated in the drawing), aqueous sulfuric acid or aqueous hydrochloric acid is contained.

As will furthermore be seen from FIG. 3, oxygen is conveyed to the cathode chamber 3 through the feeding line 7. Furthermore, electrolyte solution is withdrawn from the cathode chamber 3 through the discharge line 8. This electrolyte solution is conveyed into a container 10 which is connected to the electrolysis cell 1 and in the container is intermixed with calcium hydroxide. The peroxide forming as a result thereof is filtered by means of a filter 11 and is furthermore conveyed into a pressure-tight reaction vessel 12. Subsequently thereto, the filtrate of the electrolysis cell, which contains the organic compound Q and also contains sodium hydroxide, is again conveyed to the electrolysis cell through the line 9. In the reaction vessel 12, the peroxide is suspended in water and is intermixed under pressure with carbon dioxide. The calcium peroxide is re-precipitated to calcium carbonate. The flotation or suspension is then filtered by means of a filter 13 in the reaction vessel 12. The filtrate represents an aqueous solution of hydrogen peroxide. The hydrogen peroxide may in conformity with the requirements, and as indicated in the flow sheet, be concentrated by distilling. Furthermore, as likewise not illustrated in the drawing, it is possble to calcinate the calcium carbonate remaining as residue during the filtration, whereby carbon dioxide is freed.

Figure 4:
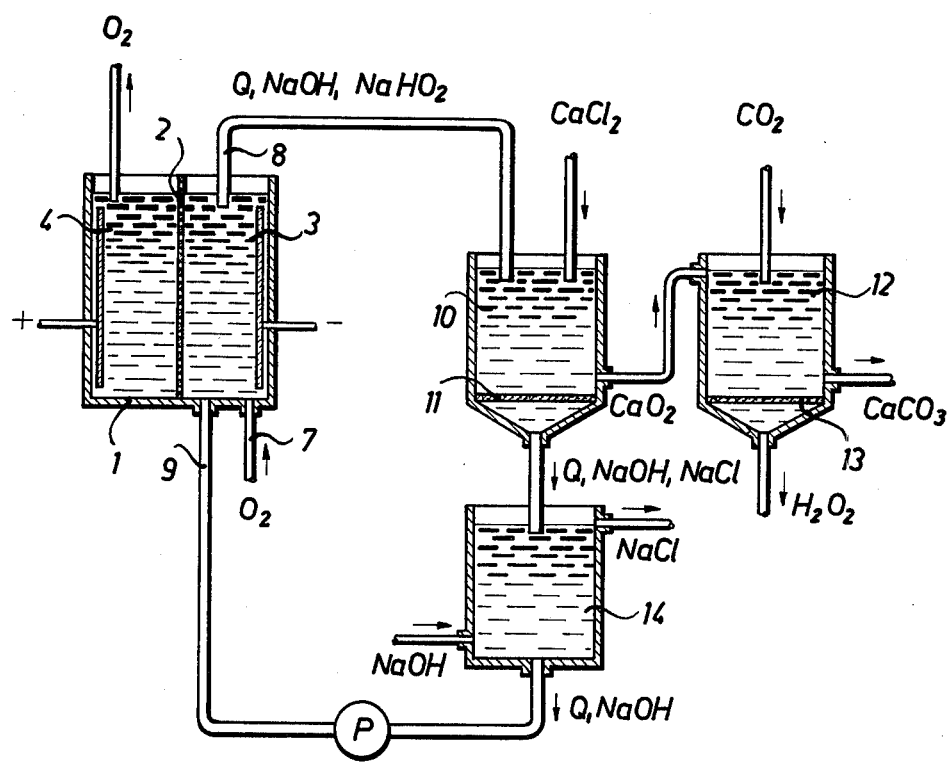
FIG. 4 is a flow sheet showing the course of the method according to the invention, according to which for purposes of precipitating the peroxide, an alkaline earth metal salt is utilized.

As will be evident from FIGS. 3 and 4, the method represented in FIG. 4 differs from that of FIG. 3 in that instead of the calcium hydroxide, calcium chloride is admitted to the electrolyte solution withdrawn from the electrolysis cell. There is likewise formed calcium peroxide which by means of the filter 11 is filtered and for purposes of forming hydrogen peroxide is further processed as illustrated in FIG. 3. The chlorine ions contained in the filtrate are then by the application of an anion exchanger 14 removed from the solution and replaced by hydroxyl ions whereupon the solution is through conduit 8 again conveyed to the electrolysis cell 1.

EXAMPLE

For purposes of practicing the method according to the invention, an electrolysis cell corresponding to the embodiment of FIG. 2 is employed while for separating the anode and cathode chamber from each other, a cation exchange diaphragm is inserted. The two electrodes have a surface of $0.36 dm^2$ each. The liquid in the anode chamber consists of an 0.1 molar nitric acid so that oxygen develops at the anode. The solution in the cathode chamber prior to the separation of the electrolysis cell consists of a solution of 0.44 mol of the sodium salt of the 2.7-anthraquinonedisulfono acid per liter 0.5 molar caustic soda. For practicing the method, 8.0 liters of oxygen per hour are blown into the solution into the cathode chamber. With a cell voltage of 4.2 volts, the current density amounts to 5 $A/dm^2$. Electrolyte liquid is withdrawn from the cathode chamber in such a quantity that a current velocity of 6.2 milliliters per minute will be obtained. The flowing-off liquid contains per liter a solution of 2.76 grams of hydrogen peroxide which corresponds to a yield current of 93%.

To the electrolyte solution withdrawn from the cathode chamber there is added calcium hydroxide in a quantity of 7 grams per liter electrolyte solution, this means somewhat more than is necessary for a complete precipitation of the peroxide as calcium peroxide. The deposit is withdrawn from the electrolyte solution by filtration and is floated with some water in a pressure-tight reaction vessel and is subsequently introduced into the suspension at an overpressure of 7 atmospheres above atmospheric pressure of carbon dioxide. The aqueous solution which is filtered off from the deposit formed by calcium carbonate contains hydrogen peroxide in a quantity which corresponds to a current yield with reference to the entire process of approximately 84%.

Experience has shown that also with an operation lasting more than 100 hours, a change in the organic substance by forming by-products could not be ascertained. The current yield in hydrogen peroxide, with reference to the electrolyte solution withdrawn from the cathode chamber of the electrolysis cell amounts throughout the time of operation without changes to from 90 to 95%, which means with reference to the total process about 85%.

It is, of course, to be understood that the present invention is, by no means, limited to the specific showing in the drawings and the specific examples set forth herein but also comprises any modifications within the scope of the appended claims.

What we claim is:

1. A method of preparing hydrogen peroxide by forming peroxide by the reduction of oxygen, which includes the steps of: preparing an electrolyte solution containing in dissolved form an organic compound adapted to form a redox system, introducing oxygen into said electrolyte solution, passing current through said electrolyte solution by means of an anode and cathode to thereby reduce the oxidized form of the organic compound on acid cathode and form the reduced form of said organic compound, reducing the oxygen introduced into said electrolyte solution by reacting said last mentioned oxygen with the thus reduced form of said organic compound while at the same time re-generating the oxidized form of said organic compound and forming peroxide, subsequently for separating out said formed peroxide adding to said electrolyte solution such a quantity of an alkaline earth metal compound selected from the group consisting of alkaline earth metal hydroxide, alkaline earth metal oxide, and alkaline earth metal salt, that the peroxide is precipitated as alkaline earth metal peroxide, subsequently filtering off said precipitated alkaline earth metal peroxide and withdrawing the same from said electrolyte solution, suspending the thus obtained alkaline earth metal peroxide in water, introducing acid into the thus formed suspension to thereby by reaction of said alkaline earth metal peroxide with said acid form hydrogen peroxide, and subsequently separating said hydrogen peroxide from said solution.

2. A method according to claim 1, which includes the step of introducing carbondioxide into said suspension of the filtered-off alkaline earth metal peroxide to transform the precipitated alkaline earth metal peroxide into alkaline earth carbonate while simultaneously forming hydrogen peroxide and filtering off and withdrawing said alkaline earth metal carbonate.

3. A method according to claim 2, in which said introducing of carbondioxide into said suspension occurs at a pressure above atmospheric pressure.

4. A method according to claim 1, in which the alkaline earth metal compound is an akaline earth metal salt, and in which the anions of said alkaline earth metal salt freed during the precipitation of said alkaline earth metal peroxide are removed from said electrolyte solution by ion exchange, and subsequently utilizing the thus obtained electrolyte solution for a new cycle of preparing hydrogen peroxide.

5. A method according to claim 1, in which as organic compound there is employed an alkali metal salt of the 2,7-anthraquinonedisulfono acid dissolved in an aqueous solution forming the electrolyte solution.

* * * * *